United States Patent Office 3,515,194
Patented June 2, 1970

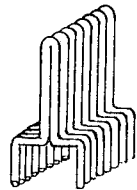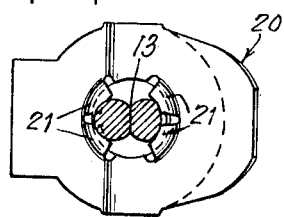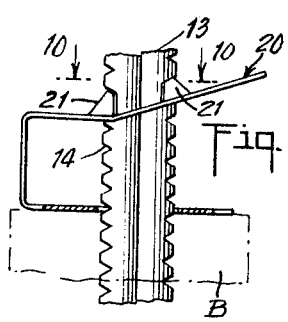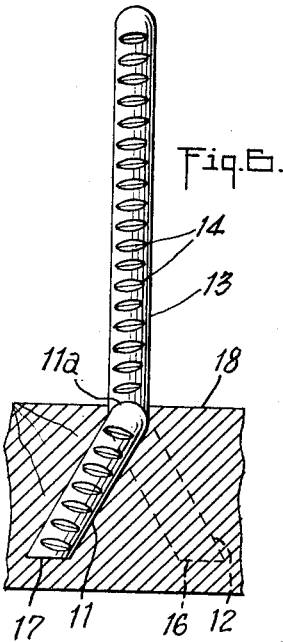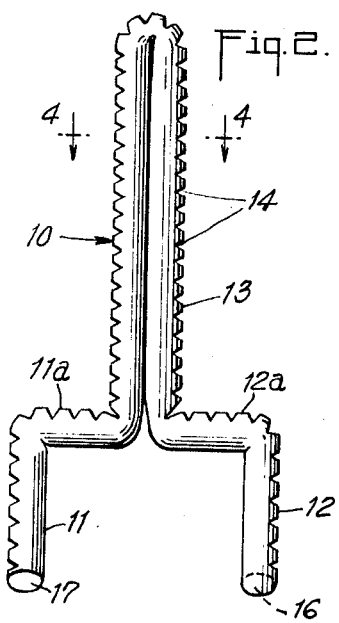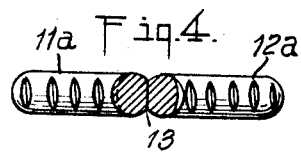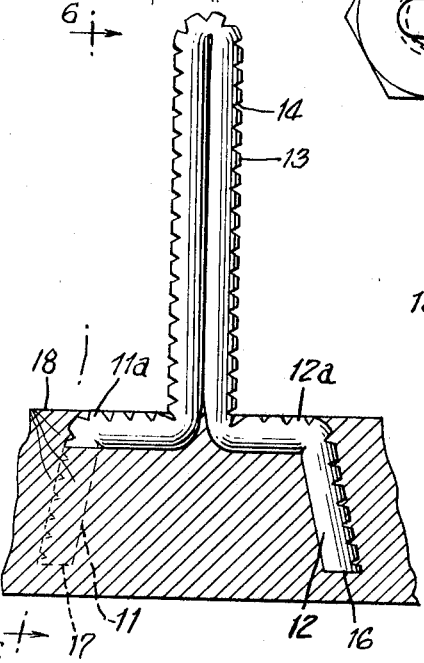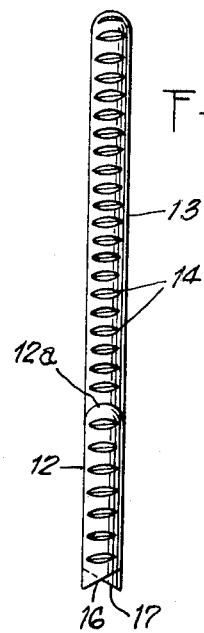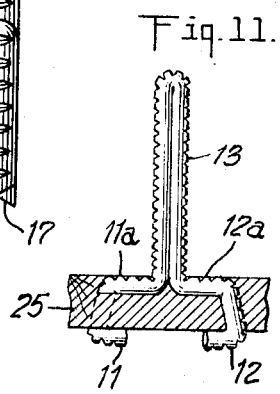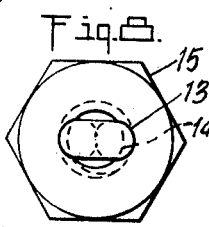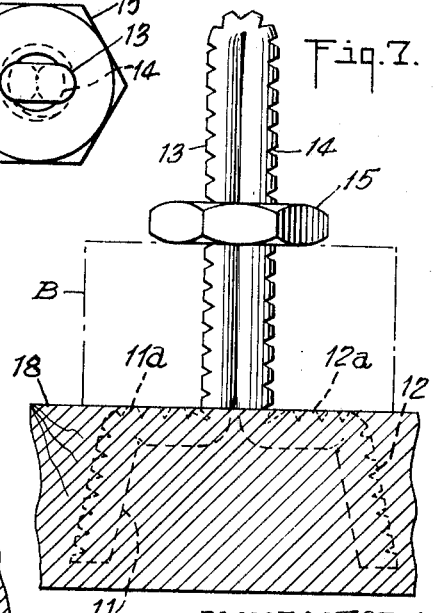

3,515,194
THREADED STAPLE
Donald Hirst, Laconia, and John L. Carhart, Franklin, N.H., assignors to Acme Staple Company, Inc., Franklin, N.H., a corporation of New Hampshire
Filed Mar. 17, 1969, Ser. No. 807,542
Int. Cl. F16b 15/00, 15/06, 35/02, 35/06
U.S. Cl. 151—41.72                                   8 Claims

ABSTRACT OF THE DISCLOSURE

A staple fastener with an elongated body portion suitably serrated or threaded along its axial length whereby to receive a conventional nut member or other suitable fastener. The points of this staple are angularly faced so as to cause controlled leg divergence as this staple is driven into a supporting medium.

---

This invention relates to a staple fastener and more particularly relates to a staple member having one end thereof adapted to be fastened to a supporting member, and having a threaded body portion at the other end for receiving a conventional nut.

It is, accordingly, among the various objects of this invention to provide a fastener which can have one end thereof tack driven into a support with means at the other end thereof for receiving a threaded nut member.

It is a further object of this invention to provide means at the driven end of this fastener for securely locking it into the support body.

Another object of this invention is to provide a staple device which can be clinched fastened as well as tack driven.

A yet further object of this invention is to provide a series of serrations along the exterior surface of this staple member for the dual purpose of increasing the holding power when driven into a supporting material, and for use as engaging means for fasteners such as a threaded nut member, a spring clip, or related devices.

Though this disclosure refers to fastener means such as threaded nut members, spring clips, and related devices, for purposes of description and ease of understanding, we will use the term "nut" or "nut member," but it is to be understood that this term is intended to embrace these other recited devices.

With these and other objects in mind, reference is now had to the following description taken in conjunction with the accompanying drawings in which:

FIG. 1 illustrates in perspective view a supply of staple devices as disclosed herein adhesively fastened together in a conventional manner;

FIG. 2 shows a front elevation view of a single staple member with threaded serrations along its surface;

FIG. 3 shows a side view of the staple illustrated in FIG. 2;

FIG. 4 shows a top sectional view taken on line 4—4 of FIG. 2;

FIG. 5 shows a typical staple of this invention driven into a support member;

FIG. 6 shows a side elevation view taken on line 6—6 of FIG. 5;

FIG. 7 shows the serrated body portion of the staple carrying a conventional threaded nut member secured against an intervening body member;

FIG. 8 shows a top plan view of FIG. 7 with the threaded-serrations conforming to the internal threads of the nut;

FIG. 9 illustrates a partial side elevation view of the threaded body portion of the staple carrying a spring-clip fastener;

FIG. 10 ilustrates a top plan view taken on line 10—10 of FIG. 9; and

FIG. 11 illustrates the staple of this invention in crimped form when employed with a pre-punched support member.

Referring now with greater particularly to the drawings, there is shown in FIG. 2 a staple 10 formed from a continuous piece of wire. This staple is comprised of leg portions 11, 12 and an integral body portion 13 which extends outwardly any desired distance. As seen in FIG. 3 the outside surface of the wire forming this staple has a series of serrations or interrupted threads 14. The threads on body portion 13 are adapted to receive and operatively coact with the corresponding threads of a nut member 15, as shown in FIG. 7. The serrations carried by leg portions 11, 12 offer additional gripping power when driven into a supporting material 18.

As more clearly depicted in FIGS. 2 and 3, the ends of leg portions 11, 12 are shaped into oppositely faced angular driving points 16, 17, respectively. The presence of this angle on the end portions of the staple legs, and the direction of each angle with respect to one another constitutes an important feature of this invention as can be observed from FIG. 6. Because of these angular portions, when the staple is forcibly driven into a support material 18, such as wood for example, the leg portions 11, 12 are angularly diverted in opposite directions thereby effectively assisting to interlock the staple with its support.

The angular faces 16, 17 may be so oriented with respect to one another as to also result in a moderate leg spreading configuration as seen in FIG. 5. The end result of such bi-directional leg travel as the staple is driven, is that the leg portions become firmly embedded in the support material, and, as such, resist any axial or torsional forces tending to withdraw the staple from its supporting material. It is to be particularly noted that the tapered faces 16, 17 are so oriented with respect to each other that when driven, the leg divergency, when viewed from above, will travel in a clockwise direction. The reason for this is that should a threaded fastener be engaged with the serrations of body portion 13 the resultant clockwise torque developed in tightening such a fastener is co-directional with leg members 11, 12. Should tapered faces 16, 17 be oriented otherwise than described, the resultant clockwise torque developed in tightening a fastener would act to generate forces tending to withdraw leg portions 11, 12 from the support material 18.

Thus, in its embedded form, shown in FIG. 5, when the staple legs are driven so that the top surface portions 11a, 12a are flush with the support surface, the threaded body portion 13 extends outwardly, somewhat as a cantilever and may, under appropriate circumstances of loading, be used as such for support purposes. Alternatively, the presence of serrations or interrupted threads 14 provide a means whereby a conventional nut 15 may be employed to securely fasten something against the face of support 18. An important feature to be recognized at this point is that where an intervening object such as B is positioned for securing between the nut 15 and leg surfaces 11a, 12a, the tightening action of the nut against such a body is impressed against the leg surfaces, and not against the surface of support 18, and, hence does not produce a resultant upward force tending to withdraw the leg portions from the supporting member. It should be obvious in light of the foregoing that this constitutes a fastening feature peculiar to the disclosed invention.

Referring now to FIGS. 9 and 10, there is shown a conventional spring-clip member 20 in a locked and secured relation with respect to threaded body portion 13. As seen from FIG. 10, the thread engaging portions 21 of this spring-clip are discontinuous so that when this clip is oriented 90° from the position illustrated, it is freely slidable along the length of body portion 13, and is, accordingly, securely locked into position by merely rotating it the required 90° to bring portions 21 into engagement with the corresponding thread portions 14 of body portion 13. Spring-clip 20 is typically fabricated from a spring-steel or other suitable material which would provide the necessary resilient characteristics to make this self-locking.

Though the disclosed embodiment illustrates the staple as being tack driven into a supporting member, it is to be understood that it can be used with equal facility when secured by clinching, as for example in connection with a pre-punched board type support. FIG. 11 illustrates the staple of this invention being used in conjunction with a pre-punched support member 25. In this embodiment, the leg portions 11, 12 are carried through the support member so as to protrude on the opposite side. As shown in this illustration, these leg portions are simply clinched or crimped so as to mechanically secure the staple into relation with member 25.

Having thus achieved the objects hereinbefore outlined, various modifications are contemplated and may obviously be resorted to by those skilled in the art, without departing from the spirit and scope of the invention as hereinafter defined by the appended claims.

We claim:

1. A one piece staple device formed of a continuous piece of wire comprising:
   (a) said wire being bent at substantially its midpoint with the two resulting sections being folded together in juxtaposition to form an elongated body portion;
   (b) the free ends of said two sections being bent outwardly in opposite directions at substantially right angles to said body portion and having a second substantially right angle bend in a direction away from said body portion to define a bifurcated portion at one end thereof forming a pair of substantially parallel leg members;
   (c) means carried by each leg member for controlling the direction of travel of said leg when the staple device is driven into a supporting medium; and
   (d) at least said body portion having a series of serrations on its opposed outer facing surfaces adapted to cooperate with engaging means on an extraneous fastening member.

2. The device of claim 1 further comprising:
   a separate fastener member cooperatively engageable with said serrations.

3. The device of claim 1 wherein said means carried by each leg member for controlling the direction of travel comprises:
   an angular-shaped face at a terminal point of the leg member, each face being cooperatively oriented with one another to provide for diverging travel of the legs.

4. The device of claim 3 further comprising:
   a separate fastener member cooperatively engageable with said serrations.

5. The device of claim 1 wherein said integral pair of leg members carry a series of serrations on their opposed outer facing surfaces.

6. The device of claim 5 further comprising:
   a separate fastener member cooperatively engageable with the serrations carried by said elongated body portion.

7. The device of claim 1 in mechanically secured combination with a pre-punched support member.

8. The device of claim 2 mechanically secured to a pre-punched support member.

References Cited

UNITED STATES PATENTS

| | | | |
|---|---|---|---|
| D. 30,896 | 5/1899 | La Prelle | 85—49 X |
| 998,987 | 7/1911 | Recker. | |
| 1,750,061 | 3/1930 | Smith et al. | |
| 1,998,251 | 4/1935 | Pool. | |
| 2,530,811 | 11/1950 | Cook | 85—49 X |
| 2,560,211 | 7/1951 | Burdick. | |
| 3,076,373 | 2/1963 | Matthews | 85—49 X |
| 3,078,900 | 2/1963 | Walker | 151—41.73 |

FOREIGN PATENTS 1,315,137    12/1962    France.

RAMON S. BRITTS, Primary Examiner

U.S. Cl. X.R.

85—1, 9, 49; 151—41.73